United States Patent Office 3,219,188
Patented Nov. 23, 1965

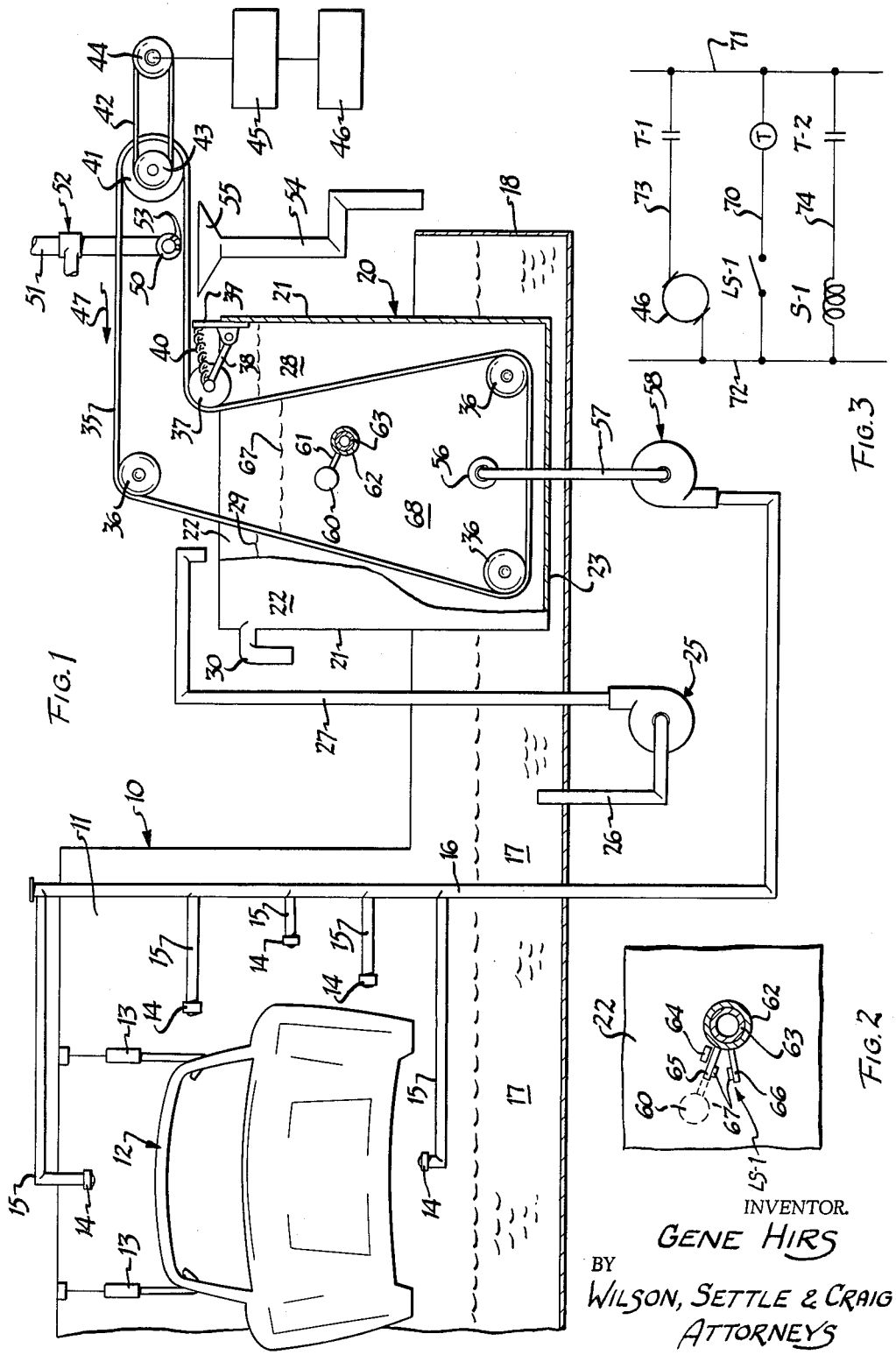

3,219,188
TRAVELING SCREEN FILTER
Gene Hirs, 17208 Greenview, Detroit, Mich.
Filed Mar. 8, 1962, Ser. No. 178,338
1 Claim. (Cl. 210—108)

The present invention relates to a traveling screen filter. More particularly, the present invention relates to an apparatus for filtering a contaminated liquid by means of a traveling screen and including means for intermittently advancing and cleaning the traveling filter medium in response to the accretion of contaminant thereon, thereby removing the contaminant and renewing the filtration capacity of the medium.

Generally, filters of the "traveling screen" type comprise a screen in the form of an endless belt trained about a plurality of supporting rollers and continuously movable through a closed path. A portion of the traveling screen dips into a body of contaminated liquid and a clean liquid or filtrate pump has its intake disposed interiorly of the closed loop, the traveling screen, of course, having its edges in sealing contact with the side walls of the contaminated liquid container, so that the liquid is forced through the screen by the flow induced through the filtrate pump intake.

In the conventional traveling screen filter arrangement, the screen continuously travels in its closed loop, being driven by one of the loop-supporting rolls, and the contaminant on the exterior surface of the screen is removed by suitable means, such as a steam pipe located interiorly of the loop at a portion of the loop outside the body of contaminated liquid, steam being directed thereby through the screen to blow contaminant from the exterior surface. Such continuously traveling screens possess several disadvantages. Initially, the continuous driving of the screen requires considerable power, and the resultant wear materially shortens the life of the filter screen. More importantly, continuouslsy driving the filter requires continuous cleaning and the utilization of tremendous quantities of steam for cleaning. Further, the conventional utilization of such a traveling screen is in a relatively shallow body of contaminant liquid, as in the drain tank of a spray booth or the like, and the filtrate pump will often cavitate, due to the lowering of the liquid head over the pump intake because of pressure drop across the filter screen.

The present invention now proposes a new and novel approach to the utilization of traveling screen-type filters wherein the above deficiencies are remedied and new and improved results are obtained.

First, the effective portion of the screen is disposed within a tank of appreciable depth, normally of a depth exceeding that of the drain tank in conjunction with which the filter is to be utilized, thereby increasing the head of filtrate over the intake of the filtrate pump. Additionally, the level of filtrate interiorly of the screen is continuously sensed by suitable means, as by a float, and the filter is intermittently indexed or advanced in accordance with the sensed level of filtrate interiorly of the filter. Due to the continuously operating filtrate pump, the level of filtrate interiorly of the filter is always lower than the level of contaminated liquid exterior to the filter, and the level of filtrate is inversely proportional to the degree of accretion of contaminant upon the exterior surface of the screen, i.e. increased contamination of the filter medium increases the resistance of filtrate flow through the medium and decreases the level of filtrate interiorly of the screen loop. When the sensed level of filtrate interiorly of the medium loop drops to a predetermined low level, the medium is indexed or advanced to remove from the tank and from the contaminated liquid therein the clogged portions of the medium. As this medium is advanced, it passes a cleaning station at which steam or other cleaning fluid is directed through the medium to remove contaminant from the exterior surface thereof, and the cleaned portion of the medium is advanced into the tank with its filtration capacity renewed. Because of the closed loop configuration of the screen, filtration is continuously accomplished during the intermittent advancing and cleaning of the filter medium. After all the contaminated portions of the filter medium have passed the cleaning station, advancement of the filter medium is interrupted by suitable means, as by a timer or the like.

Thus, it will be appreciated that the present invention provides a mechanism wherein the severe power and steam requirements of conventional traveling screen filters are substantially reduced by only intermittently advancing and cleaning the filtration medium, while at the same time complete safety and efficient operation is assured by preventing cavitation of the filtrate pump and while accommodating continuously effective filtration. The continuous sensing of the level of filtrate interiorly of the screen loop provides this safety feature, while at the same time insuring intermittent renewal of the filter medium in complete and automatic accord with the requirements of the overall filtration system.

It is, therefore, an important object of the present invention to provide a new, novel and improved traveling screen filter apparatus.

Another important object of this invention is the provision of a traveling screen filter wherein a filter medium in the form of a closed loop is intermittently indexed and cleaned in response to the accretion of contaminant on the filter medium.

Yet another important object of the present invention is the provision of an improved apparatus for filtration including means for continuously sensing the pressure drop across a filter medium and, when the pressure drop exceeds a predetermined maximum, removing a contaminated portion of the filter medium from the contaminated liquid and renewing the filtration capacity of the contaminated portion.

Still another, and no less important, object of the present invention is the provision of an improved filtration apparatus in which a permanent filter medium in the form of a closed loop is only intermittently advanced and cleaned, prior to return of the medium to service and in response to the loss of filtration efficiency in the medium.

Other objects of this invention will appear in the following description and appended claim, reference being had to the accompanying drawings forming a part of this specification wherein like reference characters designate corresponding parts in the several views.

On the drawings:

FIGURE 1 is a schematic illustration of a filtration apparatus of the present invention;

FIGURE 2 is a fragmentary view illustrating a filtrate level-responsive switch mechanism;

FIGURE 3 is an electrical diagram illustrating a portion of the control circuit for the apparatus of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a spray booth or the like having an upper enclosure 11 through which an automobile body or the like 12 is conveyed, as by suitable conveying means 13, to be cleaned or coated by liquid under pressure directed thereagainst by a plurality of nozzles 14 receiving liquid from branch pipes 15, respectively, joined to a main conduit or header 16. The liquid from the body 12 and from the space 11 falls by gravity into a lower sump body of liquid 17, this sump body of liquid 17 also being retained in a laterally extended, open-topped reservoir 18.

In a typical installation, the automobile body 12 is washed by liquid from the spray nozzles 14 after assembly of the body and after application of appropriate insulation or other prime coats to the body, the body thus being cleaned within the space 11 prior to its final painting. Consequently, the liquid in the sump body 17 is contaminated with rust, "dum-dum," welding flash, dirt and the like. It is, of course, desirable to recirculate the washing liquid from the sump 17 through the nozzles 14, but the contaminants therein would clog the nozzles 14, so the liquid 17 must be filtered prior to its re-use.

Reference numeral 20 refers to a filtration tank having end walls 21, side walls 22, and a bottom wall 23, this tank having it bottom wall 23 immersed in the body of contaminant liquid 17. This tank 20 receives contaminated liquid from the sump body 17 from a pump 25 having its intake connected, as through conduit 26, to sump body 17 and having its outlet discharging through conduit 27 into the tank 20 through the open top thereof. The pump 25 is preferably driven continuously and maintains interiorly of the tank 21 a body 28 of contaminated liquid, the upper level 29 of this liquid body 28 being maintained by a lateral drain pipe 30 communicating freely with the tank interior.

An endless filter medium 35 in the form of a wire mesh screen having apertures of the desired size, i.e. on the order of from $\frac{1}{64}$ to $\frac{1}{16}$ of an inch is supported in an endless loop on a plurality of fixed, freely rotatable support rolls 36. Disposed within the closed loop 35 are a tension roll 37 rotatably journalled at the free end of a pivoted arm 38 carried by a fixed tank bracket 39 and urged upwardly by a coiled tension spring 40, and a somewhat larger drive roll 41 driven by suitable means, as by a drive belt 42 lapping a sheave 43 concentrically rotatable with the drive roll 41 and a driving sheave 44 driven by suitable means, schematically represented as a speed change mechanism 45 and an electric drive motor 46.

The rolls 36, 37 and 41 thus support the filter medium 35 in an endless loop, the spring-urged roll 37 maintaining tension in the loop, and the drive roll 41 serving to advance the filter medium 35 in translatory fashion, i.e. in the direction of directional arrow 47, upon actuation of the motor 46, the medium being advanced at a speed determined by the change speed mechanism 45. Of course, the parallel longitudinal edges of the looped filter medium are sealingly engaged with the side walls 22 of the tank 20.

It will be noted that the various support, tension and drive rolls 36, 37, 41 support the filter medium 35, so that a major portion of the filter medium is disposed within the body of contaminated liquid 28 within the tank 20, with a minor portion of the filter medium 35 being supported exteriorly of the tank and in a position generally overlying the tank.

Disposed within that portion of the filter medium 35 exterior to the tank is a transversely disposed conduit 50 connected, as by a supply conduit 51 to a source of cleaning fluid, such as steam, air or the like, the flow of cleaning fluid through the line 51 into the conduit 50 being controlled by suitable means, such as a solenoid-actuated valve indicated generally at 52. The conduit 50 is apertured, as at 53, so that the cleaning fluid under pressure is directed generally downward through the filter medium or screen 35 and in a direction from the interior of the screen to the exterior thereof. A drain conduit 54 provided with an upper, flared catch basin 55 is oppositely disposed to the conduit 50 and exteriorly of the loop.

Disposed interiorly of the looped filter medium 35 and adjacent the bottom of the tank 20, i.e. within the lower regions of the filter medium loop, is a filtrate intake 56 connected by conduit 57 to the intake of a pump 58, this pump discharging into the main spray conduit 16.

Also disposed interiorly of the tank 20 and substantially above the level of the pump intake 56 is a buoyant float 60 connected through an arm 61 to a freely rotatable support pipe 62 concentrically surrounding an interior fixed pipe 63. This pipe 62 is freely rotationally movable in a counterclockwise direction from its illustrated position and is prevented from movement in a clockwise direction from its illustrated position by an external stop, hereafter more fully described. The two pipes 62 and 63 project completely across the interior of the tank 20, the pipe 62 being journalled at its ends in the tank side walls 22 for free rotational movement, and the pipe 63 being fixedly supported by the side walls 22. One of the side walls 22 of the tank 20 carries a fixed abutment 64 providing the stop for the pipe 62. Additionally, the exterior pipe 62 bears a switch contact arm 65 secured thereto for rotational movement therewith and abutting the stop 64 when the float 60 is in its normal, illustrated position. The fixed pipe 63 bears a cooperating, fixed contact arm 66 projecting radially therefrom and vertically aligned with the arm 65. The arms 65 and 66 carry electrical contact points 67' cooperatively defining a limit switch LS1.

Due to the presence of the intake 56 of the pump 58 interiorly of the screen, the level of the upper surface 67 of the body of filtrate 68 interiorly of the screen will always be below the level of the upper surface 29 of the contaminated body of liquid 28 within the tank 20. As the filter medium 35 becomes progressively contaminated, the difficulty of liquid flow through the filter medium increases and the level 67 of the filtrate body 68 will progressively lower. When this level 67 reaches a predetermined low point, the buoyant float 60 and the contact arm 65 move counterclockwise until the switch contacts 67' of limit switch LS1 close. Thus, actuation of the limit switch LS1 can be defined as being in response to the pressure drop across the filter medium 35 or, alternatively, as being in response to the filtrate liquid level within the tank 20, or alternatively, as being in response to the accretion of contaminant from the body of contaminated liquid 28 upon the filter medium 35.

As illustrated in the fragmentary circuit diagram of FIGURE 3 of the drawings, the closure of the limit switch LS1 actuates the timer T, since the limit switch and the timer are interconnected by electrical lead line 70 bridging the two current source lines 71 and 72. Actuation of the timer T closes the timer contacts T1 in the lead line 73 to energize the motor 46, thus driving the drive rolls 41 and advancing the filter medium 35 in the direction of directional arrow 47. Actuation of the timer T also closes the timer contacts T2 in the lead line 74 to energize the solenoid S1 of the valve 52, thus passing cleaning fluid, such as steam, through the transverse conduit 50 from the supply conduit 51, the steam from the conduit ports 53 being directed outwardly through the filter medium or screen 35 to loosen and remove contaminant from the lower exterior surface of that reach of the filter screen between the tension roll 37 and the drive roll 41, the so-removed contaminant falling into the collection pan 55 and being removed to waste disposal through the conduit 54.

The advantages of the present invention will be immediately obvious to those skilled in the art. These advantages include, but are not limited to, the following:

(1) The use of the buoyant float 60 in conjunction with the tank 20 insures the constant presence of a body of filtrate 68 of a depth sufficient to prevent cavitation of the pump 58, such as normally occurs when the liquid level 67 drops so far as to allow air to enter the pump intake 56.

(2) The use of the float 60 provides the means for controlling the intermittent advancement and cleaning of the filter medium 35 by initiating such advancement and cleaning in response to the pressure drop across the filter medium 35 or in response to lowering of the filtrate level 67 or in response to the accretion of deleteriously large amounts of contaminant on the filter medium 35.

(3) The intermittent driving of the filter medium 35 avoids the necessity of continuously advancing the same, thereby preventing undue wear upon the filter medium, avoiding continuous operation of the motor 46, and avoiding the use of unnecessarily large amounts of power for merely driving the screen.

(4) The intermittent cleaning of the filter medium avoids the continued subjection of the filter medium to steam with resultant undue corrosion and erosion, and, more importantly, consumes only a fraction of the steam necessary where the cleaning operation is continuously carried out.

5. It will be appreciated that the timer T affords a ready, accurate control over the period during which the filter medium is advanced and cleaned, and variation of the timer interval to provide the desired or necessary travel and cleaning time may be readily accommodated.

I claim:

A filter comprising an endless filter screen, a plurality of rolls supporting said screen for movement in a closed path, means for driving one of said rolls to move said screen in said path, a tank containing a body of contaminated liquid of a depth sufficient to only partially immerse said screen therein, supply means for supplying contaminated liquid to said tank means including said supply means maintaining the depth of contaminated liquid in said tank constant, a filtrate pump having an intake disposed interiorly of said closed path at a location adjacent the bottom of said tank, the passage of liquid through said screen depositing contaminant on said screen and the progressive accretion of contaminant on said screen dropping the level of filtrate interiorly thereof, cleaning means at a fixed location exteriorly of said tank and traversed by said screen as it moves in said path to remove contaminant from said screen, and means responsive to the level of filtrate interiorly of said screen to simultaneously actuate said driving means and said cleaning means.

References Cited by the Examiner

UNITED STATES PATENTS 3,012,677 12/1961 Hungate _____ 210—108
3,039,610 6/1962 Black _____ 210—400 X REUBEN FRIEDMAN, *Primary Examiner.*

HERBERT L. MARTIN, *Examiner.*